(12) United States Patent
Miyajima

(10) Patent No.: US 11,336,594 B2
(45) Date of Patent: May 17, 2022

(54) INFORMATION PROCESSING SYSTEM AND INFORMATION PROCESSING METHOD

(71) Applicant: SONY CORPORATION, Tokyo (JP)

(72) Inventor: Yasushi Miyajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 219 days.

(21) Appl. No.: 15/751,928

(22) PCT Filed: Jul. 8, 2016

(86) PCT No.: PCT/JP2016/070208
§ 371 (c)(1),
(2) Date: Feb. 12, 2018

(87) PCT Pub. No.: WO2017/068817
PCT Pub. Date: Apr. 27, 2017

(65) Prior Publication Data
US 2018/0241701 A1    Aug. 23, 2018

(30) Foreign Application Priority Data
Oct. 20, 2015  (JP) .............................. JP2015-206444

(51) Int. Cl.
*H04L 12/58* (2006.01)
*H04L 51/02* (2022.01)
(Continued)

(52) U.S. Cl.
CPC .......... *H04L 51/02* (2013.01); *G06F 16/9566* (2019.01); *G06Q 30/0277* (2013.01);
(Continued)

(58) Field of Classification Search
CPC ..... H04L 51/02; H04L 51/04; H04L 12/1813; G06Q 30/02; G06Q 30/0277; G06Q 30/0241; G06Q 30/01; G06Q 30/0251
See application file for complete search history.

(56) References Cited

U.S. PATENT DOCUMENTS 6,339,774 B1    1/2002  Nakayama et al.
6,393,461 B1    5/2002  Okada et al.
(Continued)

FOREIGN PATENT DOCUMENTS

CN       103024066 A     4/2013
CN       104639420 A     5/2015
(Continued)

OTHER PUBLICATIONS

International Search Report dated Sep. 27, 2016 in PCT/JP2016/070208 filed Jul. 8, 2016.

*Primary Examiner* — Tom Y Chang
(74) *Attorney, Agent, or Firm* — Oblon, McClelland, Maier & Neustadt, L.L.P.

(57) ABSTRACT

An information processing system and an information processing method to enable a conversation to be animated with a response of a virtual agent having proper personality corresponding to a communication situation between users. The information processing system includes: a virtual agent profile database that accumulates profiles of a plurality of virtual agents capable of communication on a network; and a controller that selects one virtual agent from the plurality of virtual agents in accordance with an analysis result of communication between real users, generates a message in accordance with the analysis result and the profile of the one virtual agent, and posts the generated message to a communication session between the real users.

11 Claims, 18 Drawing Sheets

(51) Int. Cl.
  *G06F 16/955* (2019.01)
  *G06Q 50/10* (2012.01)
  *G06Q 30/02* (2012.01)
  *G06Q 50/00* (2012.01)
  *H04L 51/046* (2022.01)
  *H04L 51/52* (2022.01)
  *H04L 51/04* (2022.01)

(52) U.S. Cl.
  CPC .............. *G06Q 50/01* (2013.01); *G06Q 50/10*
      (2013.01); *H04L 51/046* (2013.01); *H04L*
      *51/32* (2013.01); *H04L 51/04* (2013.01)

(56) References Cited

U.S. PATENT DOCUMENTS

| | | | |
|---|---|---|---|
| 9,929,982 B2 * | 3/2018 | Morris | H04L 51/02 |
| 2001/0033298 A1 * | 10/2001 | Slotznick | H04L 51/04 |
| | | | 715/758 |
| 2008/0189367 A1 | 8/2008 | Okumura | |
| 2010/0191812 A1 * | 7/2010 | O'Donovan | G06Q 10/107 |
| | | | 709/206 |
| 2011/0246910 A1 * | 10/2011 | Moxley | G06Q 10/10 |
| | | | 715/758 |
| 2012/0011003 A1 * | 1/2012 | Ketchum | G06Q 30/0276 |
| | | | 705/14.72 |
| 2012/0290950 A1 * | 11/2012 | Rapaport | H04N 21/8358 |
| | | | 715/753 |
| 2014/0011487 A1 * | 1/2014 | Hwang | G06K 9/00221 |
| | | | 455/416 |
| 2014/0111689 A1 | 4/2014 | Kim et al. | |
| 2014/0122083 A1 * | 5/2014 | Xiaojiang | H04L 51/02 |
| | | | 704/270.1 |
| 2014/0359439 A1 * | 12/2014 | Lyren | G06F 3/011 |
| | | | 715/705 |
| 2016/0099892 A1 * | 4/2016 | Palakovich | H04L 51/02 |
| | | | 709/206 |

FOREIGN PATENT DOCUMENTS

| | | |
|---|---|---|
| JP | 10-222521 A | 8/1998 |
| JP | 11-272577 A | 10/1999 |
| JP | 2001-109689 A | 4/2001 |
| JP | 2004-234492 A | 8/2004 |
| JP | 2005-196356 A | 7/2005 |
| JP | 2008-191748 A | 8/2008 |
| JP | 2014-86088 A | 5/2014 |
| JP | 2015-69455 A | 4/2015 |

* cited by examiner

FIG.4

BASIC PROFILE

| PERSON ID | FAMOUS-PERSON FLAG | NAME | NICKNAME | GENDER | AGE |
|---|---|---|---|---|---|
| 1 | true | ARTIST U | UU | FEMALE | 32 |

| HOMETOWN | RESIDENTIAL PLACE | OCCUPATION | KEYWORD (ID MANAGEMENT) |
|---|---|---|---|
| NEW YORK STATE | TOKYO | MUSICIAN | J-POP, POPS, COMPOSITION, LYRICS ⋯ |

ACTIVITY INFORMATION

| ACTIVITY ID | ACTIVITY TYPE | DATE AND TIME | CONTENT LINK | ADVERTISEMENT FLAG | KEYWORD (ID MANAGEMENT) |
|---|---|---|---|---|---|
| 1 | CONCERT | 2015/09/15 | movie:12345 | true | CHARITY, DOME, NATIONAL TOUR ⋯ |
| 2 | MUSIC | 2011/06/12 | movie:54321 | true | AAA, ABAB, BBC ⋯ |
| 3 | blog | 2015/08/04 | http://www.⋯/12452 | false | FIREWORK, SUMMER FESTIVAL, TOKYO ⋯ |
| 4 | NEWS | 2014/05/25 | http://www.⋯/53121 | false | CHILDBIRTH, REMARRIAGE, FOREIGNER, YOUNGER ⋯ |
| 5 | POSTING OF SHORT SENTENCE | 2015/06/15 | http://www.⋯/74745 | false | RELEASE OF NEW SONG, CM SONG ⋯ |

HUMAN RELATIONSHIP INFORMATION

| HUMAN RELATIONSHIP ID | TARGET PERSON ID | TARGET PERSON NAME | RELATIONSHIP | KEYWORD (ID MANAGEMENT) |
|---|---|---|---|---|
| 1 | 5 | SINGER F | MOTHER | SINGER, FAMOUS PERSON, SONG PROGRAM ⋯ |
| 2 | 34 | ARTIST I | FRIEND | GUITARIST, MUSIC FRIEND, SURPRISE ⋯ |
| 3 | 43 | ENTERTAINER W | BAD | INFORMATION PROGRAM, BASHING, CHILDBIRTH, PUBLICITY ⋯ |

FIG. 5

KEYWORD INFORMATION

| KEYWORD ID | KEYWORD | SIMILAR KEYWORD ID |
|---|---|---|
| 1 | LIVE | 3, 4, 7, 8 |
| 2 | CHARITY | 62, 986 |
| 3 | NATIONAL TOUR | 1, 10, 378 |
| 4 | FESTIVAL | 1 |
| 5 | MARRIAGE | 53, 987, 1112 |
| ... | ... | ... |

FIG. 14

BASIC PROFILE

| PERSON ID | FAMOUS-PERSON FLAG | NAME | NICKNAME | GENDER | AGE |
|---|---|---|---|---|---|
| 384 | false | USER K | KK | MALE | 24 |

| HOMETOWN | RESIDENTIAL PLACE | OCCUPATION | KEYWORD (ID MANAGEMENT) |
|---|---|---|---|
| J CITY, N PREFECTURE | Y CITY, K PREFECTURE | BUSINESSPERSON | ENGINEER, FILM FESTIVAL, ARTIST U ·· |

ACTIVITY INFORMATION

| ACTIVITY ID | ACTIVITY TYPE | DATE AND TIME | | ADVERTISEMENT FLAG | KEYWORD (ID MANAGEMENT) |
|---|---|---|---|---|---|
| 1 | TRAVEL | 2013/06/22 | https://www.···/story | false | PARIS, LOUVRE MUSEUM, PARIS OPERA, Air France, AIRLINE MEAL |
| 2 | COMMUTING | 2014/02/12 | http://news.···/shakai/510 | false | DELAY, MECHANICAL TROUBLE, Y STATION, CROWDED, FREE ALTERNATIVE TRANSPORT |
| 3 | FILM APPRECIATION | 2015/08/04 | http://www.···movie | false | YY CINEMAS, OO HEAD, FUN |
| 4 | POSTING OF SHORT SENTENCE | 2015/08/15 | https://www.···/kk/593 | false | RAMEN, SS-DO, Y RAMEN, M SHOP |

HUMAN RELATIONSHIP INFORMATION

| HUMAN RELATIONSHIP ID | TARGET PERSON ID | TARGET PERSON NAME | RELATIONSHIP | KEYWORD (ID MANAGEMENT) |
|---|---|---|---|---|
| 1 | 421 | USER M | WIFE | FULL-TIME HOUSEWIFE, CHILDCARE, 2-YEAR CHILD, TOY BLOCKS, KU HOSPITAL |
| 2 | 7823 | USER H | FRIEND | UNIVERSITY DAYS, BAND FRIEND, DRINKING FRIEND, CONTEMPORARY |
| 3 | 4566 | USER S | COLLEAGUE | S COMPANY, K CO. LTD., DRUMMER, ENGINEER |

FIG. 17

EDIT bot KNOWLEDGE DATA

BASIC PROFILE  *ITEMS WITH GRAY BACKGROUND CANNOT BE CHANGED

| | |
|---|---|
| PERSON ID | 384 |
| FAMOUS-PERSON FLAG | false |
| NAME | USER K |
| NICKNAME | KK |
| GENDER | MALE |
| AGE | 24 |
| HOMETOWN | J CITY, N PREFECTURE |
| RESIDENTIAL PLACE | Y CITY, K PREFECTURE |
| OCCUPATION | BUSINESSPERSON |
| KEYWORD | ENGINEER, FILM FESTIVAL, ARTIST U |

EDIT bot KNOWLEDGE DATA

ACTIVITY INFORMATION  *ITEMS WITH GRAY BACKGROUND CANNOT BE CHANGED

| ACTIVITY ID | 1 |
| --- | --- |
| TYPE | TRAVEL ▽ |
| | MEAL |
| | FILM, CONCERT |
| | HOBBY |
| | ... |
| DATE AND TIME | 2013/06/22 |
| CONTENT URL | https://www.・・・/story |
| KEYWORD | PARIS, LOUVRE MUSEUM, PARIS OPERA, Air France, AIRLINE MEAL |

320

INFORMATION PROCESSING SYSTEM AND INFORMATION PROCESSING METHOD

TECHNICAL FIELD

The present disclosure relates to an information processing system and an information processing method.

BACKGROUND ART

In recent years, messages have been frequently exchanged via a network with development of a communication technology. Further, various chat systems capable of exchanging messages in real time are also provided on social networking services.

Regarding the chat system, for example, the following Patent Literature 1 discloses a system for preparing a pseudo user (pseudo client) as a speaking partner of a user in a case where there is nobody in a chat room and establishing a conversation with automatic speaking.

CITATION LIST

Patent Literature

Patent Literature 1: JP 2001-109689A

DISCLOSURE OF INVENTION

Technical Problem

However, in the above-disclosed system in which the pseudo client speaks, an automatic response is possible depending on contents of a conversation. However, in any situation, the response is mechanically and uniformly given, the user has no feeling to the pseudo client, and the conversation is hard to be animated.

Accordingly, according to the present disclosure, an information processing system and an information processing method are proposed to enable a conversation to be animated with a response of a virtual agent having proper personality corresponding to a communication situation between users.

Solution to Problem

According to the present disclosure, there is proposed an information processing system including: a virtual agent profile database that accumulates profiles of a plurality of virtual agents capable of communication on a network; and a control unit that selects one virtual agent from the plurality of virtual agents in accordance with an analysis result of communication between real users, generates a message in accordance with the analysis result and the profile of the one virtual agent, and posts the generated message to a communication session between the real users.

According to the present disclosure, there is proposed an information processing method including, by a processor: selecting one virtual agent from a plurality of virtual agents capable of communication on a network in accordance with an analysis result of communication between real users; generating a message in accordance with the analysis result and a profile of the one virtual agent accumulated in a virtual agent profile database; and posting the generated message to a communication session between the real users.

Advantageous Effects of Invention

As mentioned above, according to the present disclosure, it is possible to animate a conversation with a response of a virtual agent having proper personality corresponding to the communication situation between users.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram illustrating an example of a profile stored in a bot knowledge DB according to the present embodiment.

FIG. 5 is a diagram illustrating an example of a keyword information table according to the present embodiment.

FIG. 14 is a diagram illustrating an example of a profile of an ordinary person stored in a bot knowledge DB according to the present embodiment.

FIG. 17 is a diagram illustrating an example of a basic profile editing screen of a bot profile according to the present embodiment.

FIG. 18 is a diagram illustrating an example of an activity information editing screen of a bot profile according to the present embodiment.

MODE(S) FOR CARRYING OUT THE INVENTION

Figure 1:
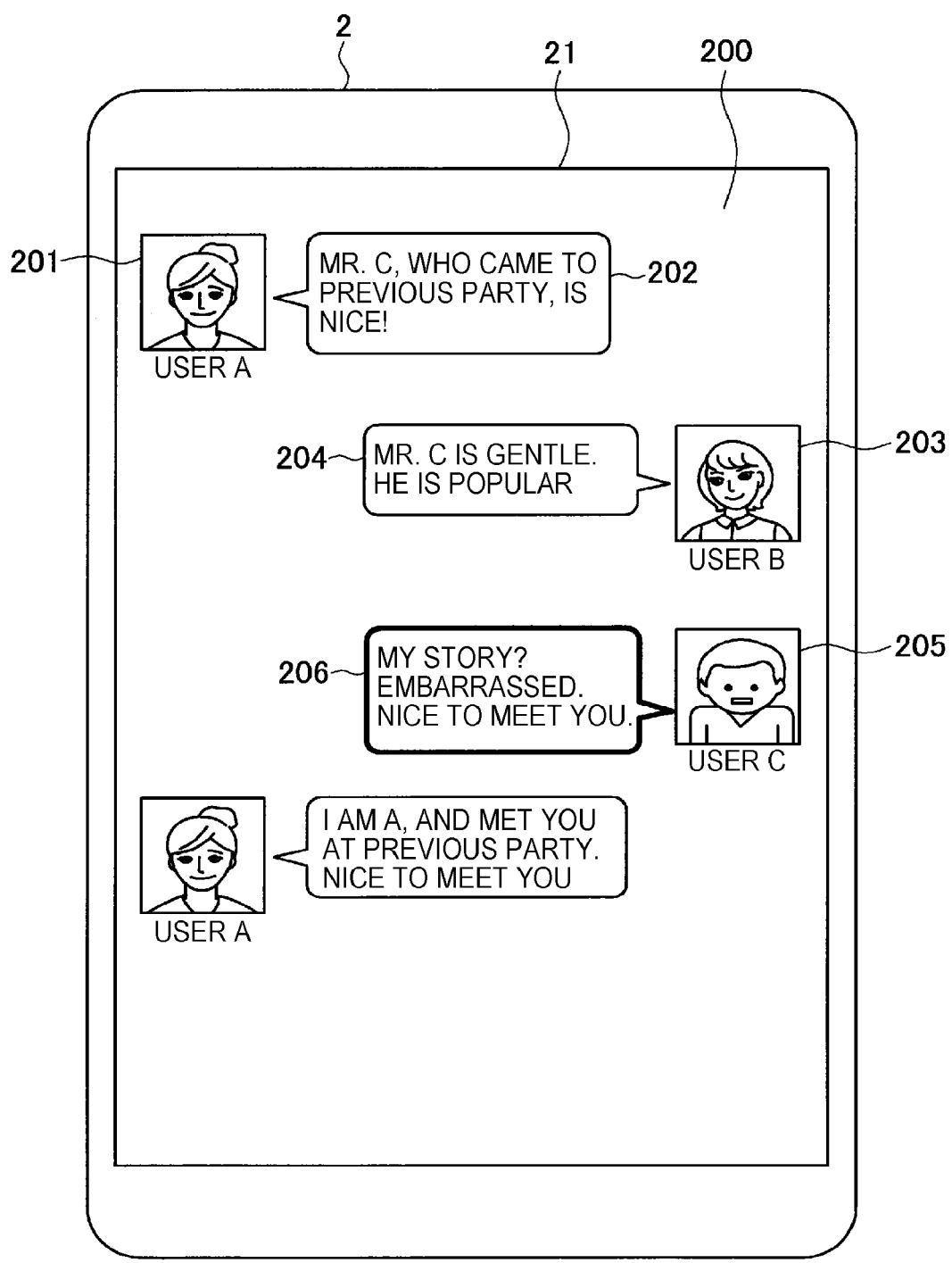
FIG. 1 is a diagram explaining an application example of an information processing system according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a description will be given in the following order.
1. Outline of information processing system according to one embodiment of the present disclosure
2. Configuration of processing server
3. Operating processing
3-1. Response control of famous-person bot
  3-1-1. Message posting processing of famous-person bot
  3-1-2. Message generating processing of famous-person bot
  3-1-3. In-person interrupt processing
3-2. Response control of ordinary-person bot
4. Editing of bot knowledge DB
5. Conclusion

1. OUTLINE OF INFORMATION PROCESSING SYSTEM ACCORDING TO ONE EMBODIMENT OF THE PRESENT DISCLOSURE

With an information processing system according to the present embodiment, a conversation with a virtual agent having proper personality can be animated by controlling a response of the virtual agent depending on a communication situation between users. Hereinbelow, in the present embodiment, a virtual agent that performs a response with a message or voice is referred to as a bot.

FIG. 1 is a diagram explaining an application example of the information processing system according to the present embodiment. For example, such a case is assumed that a message is exchanged with a friend (so-called a chat) by using an information processing device 2 such a smartphone, a tablet terminal, a mobile phone terminal, or a personal computer (PC). A chat screen 200 is displayed on a display unit 21 in the information processing device 2, and the exchange of a message between a user A and a user B and icons 201 and 203 of the individual users are displayed.

Herein, as illustrated in FIG. 1, the user A sends a message 202 of "Mr. C who came to the previous party is nice!". The user B sends a message 204 as a response of "Mr. C is gentle! He is popular." In a case where there is a topic of "man C", the information processing system according to the present embodiment presents a message 206 of a bot having personality of the user C, thereby enabling the chat to be animated. In the case, as illustrated in FIG. 1, an icon 205 of the message 206 may clearly illustrate a bot obtained by processing an icon of the user C. For example, a facial image of the user C may be arranged like a robot. Further, the message of the bot having personality of a predetermined person is generated in accordance with a profile of the predetermined person that can be registered in advance and occasionally updated. As a consequence, it is possible to generate a message that can be responded by the predetermined user, i.e., the message of the bot having the personality of the predetermined user.

Figure 2:
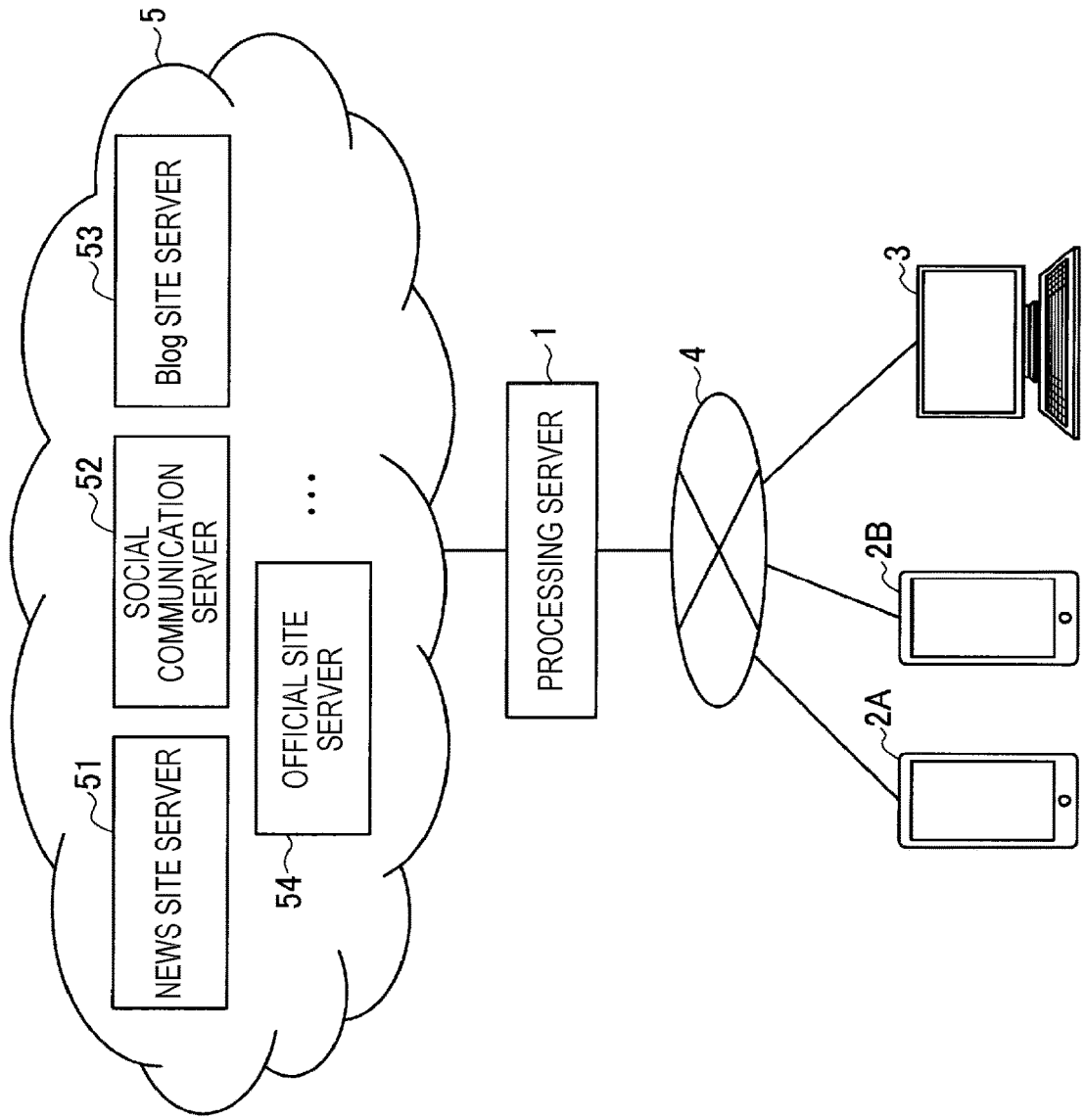
FIG. 2 is a diagram explaining the entire configuration of the information processing system according to the present embodiment.

Hereinbelow, a description will be given of a configuration of the information processing system according to the present embodiment described above with reference to FIG. 2. FIG. 2 is a diagram explaining the entire configuration of the information processing system according to the present embodiment.

As illustrated in FIG. 2, the information processing system according to the present embodiment includes information processing devices 2A and 2B that the individual users have and a processing server 1. Under control of the processing server 1, the information processing devices 2A and 2B can exchange in real time messages via a network 4 (i.e., text-based conversation). In the case, the processing server 1 analyzes contents of the message, compares an analysis result with a profile registered to a bot knowledge DB 12 (refer to FIG. 3), and determines a bot that can join in a conversation held between the information processing devices 2A and 2B. The profile registered to the bot knowledge DB 12 can include information of various kinds of characters as well as information of existent user (or a person who died) such as a famous person or an ordinary person. The processing server 1 collects various information relating to the user or the character linked to the bot registered to the bot knowledge DB 12 from a group of information 5 (for example, a news site server 51, a social communication server 52, a Blog site server 53, an official site server 54, etc.) on a cloud and stores the profile. In a case of a user or a famous person, the profile accumulated in the bot knowledge DB 12 can be edited by a manager, a fan, a general user, or the like. An editing terminal 3 or the information processing device 2 edits the profile.

With the above-mentioned configuration, in the present embodiment, it is possible to select a best pseudo user (bot) and cause the pseudo user to join in the conversation depending on contents of the conversation of the user who has already had the conversation. Further, a bot for selection is linked to an existent user (an ordinary person or a famous person), a person who died (a person on a history or the like), or a character (a local character, a character of a movie or a drama, a virtual character, or the like), and a message is generated depending on a profile relating to a corresponding person or character. Therefore, speaking of the bot joining in the conversation is not the message that is only mechanically generated and can result in feeling the personality of the linked existent person or character. As a consequence, the user has a feeling to the bot joining in the conversation and it can be expected that the conversation is animated.

Further, the person linked to the bot may view the exchange of messages in a case where a bot of the person joins. Furthermore, the person can join in the chat in the middle, and the conversation thus can be further animated.

The above description has been given of the outline of the information processing system according to the present embodiment. Subsequently, a specific description will be given of a configuration of the processing server 1 included in the information processing system according to the present embodiment.

2. CONFIGURATION OF PROCESSING SERVER

Figure 3:
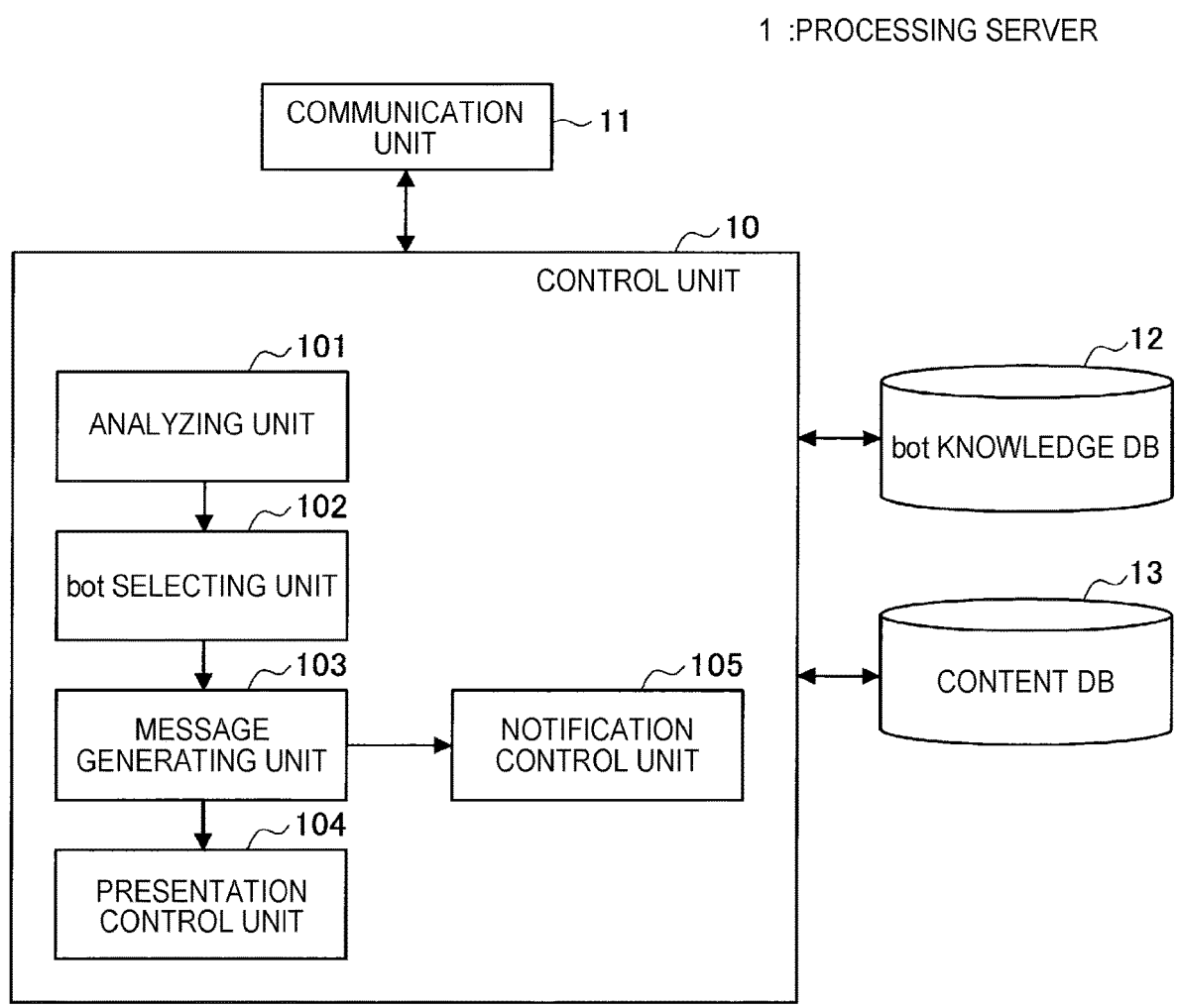
FIG. 3 is a block diagram illustrating an example of a configuration of a processing server according to the present embodiment.

FIG. 3 is a block diagram illustrating an example of a configuration of the processing server 1 according to the present embodiment. As illustrated in FIG. 3, the processing server 1 includes a control unit 10, a communication unit 11, the bot knowledge DB (database) 12, and a content DB 13.

The communication unit 11 sends and receives data to/from an external device via a wired/wireless manner. For example, the communication unit 11 is connected to the information processing device 2 used in a case where a user performs a text-based chat, the editing terminal 3, and various kinds of servers included in the group of information 5 on the cloud, thereby sending and receiving data.

The control unit 10 functions as an arithmetic processing device and a control device, and controls the whole operations in the processing server 1 under various kinds of programs. The control unit 10 is realized by, for example, an electronic circuit such as a central processing unit (CPU) or a microprocessor. Further, the control unit 10 according to the present embodiment also functions as an analyzing unit 101, a bot selecting unit 102, a message generating unit 103, a presentation control unit 104, and a notification control unit 105.

The analyzing unit 101 analyzes communication (for example, the text-based chat or voice chat) between real users obtained from the communication unit 11, and extracts a word as search keyword.

The bot selecting unit 102 selects one bot from a plurality of bots stored in the bot knowledge DB 12 in accordance with an analysis result of the analyzing unit 101. Specifically, the bot selecting unit 102 searches profiles of the individual bots stored in the bot knowledge DB 12 on the basis of a word extracted by the analyzing unit 101, and selects a matching bot.

The message generating unit 103 generates a message in accordance with the analysis result of the analyzing unit 101 and the profile of the bot selected by the bot selecting unit 102. Specifically, the message generating unit 103 generates, on the basis of the profile of the selected bot, the message corresponding to the contents (for example, contents of a conversation) of the communication between the real users, which is analyzed by the analyzing unit 101. For example, in a case where real users have a conversation about a new song of a specific artist, the message generating unit 103 extracts information (on-sale date, a title, a privilege, or the like) relating to a new song from the profile of the artist and generates the message.

The presentation control unit 104 controls to join the message generated by the message generating unit 103 in the communication between the real users. Specifically, the presentation control unit 104 controls to post the message on the chat screen whereon the real users have a text-based conversation.

The notification control unit 105 controls various notifications to the person linked to the selected bot. For example, the notification control unit 105 controls to notify the person linked to the selected bot of the generated message before/after posting the generated message to a communication session between the real users.

The bot knowledge DB 12 is a storing unit that stores knowledge data of a plurality of bots, i.e., the profile of the person or character linked to the bot. Herein, FIG. 4 illustrates an example of the profile stored in the bot knowledge DB 12 according to the present embodiment. The profile illustrated in FIG. 4 is data of an artist U as a famous person, and includes information collected from a blog or an official homepage of the artist U, a news site, or the like on the cloud as well as the information that is registered in advance. As specifically illustrated, the profile includes, for example, a basic profile, activity information, and human relationship information.

The basic profile includes a basic profile of the person linked to the bot and is also linked to a basic keyword relating to the person. Further, not only information relating to a hometown or a residential place is used as a search keyword in a case of selecting the bot but also a dialect can be added to a message to be generated, depending on areas.

The activity information includes information such as a meeting for handshaking, a lecture meeting, and film release. Regarding the information, the artist U and an employee of an office to which the artist U belongs may be officially set, or may be registered on the basis of fan's editing. Further, the activity information can also be obtained from the news site, the blog, or the like on the cloud. Therefore, it is also possible to periodically crawl Web sites and perform mining of the information. Further, in a case of commercial content information relating to a music piece, a video image, a concert, or the like, as illustrated in FIG. 4, an advertisement flag is set to "true", thereby using the information for promotion writing. Further, in a case of storing the music piece or the video image to the content DB 13, link information to the content is also included in the activity information. Note that the link information is not limited to the link to the content stored in the content DB 13, and may be linked to the content stored in a content server (not illustrated) on the cloud, a relating Web site, or the like. As a consequence, it is possible to embed the link to the content to a message that is automatically generated. The link embedded to the message is link of content that match at least any one of the profile of the selected bot and the analyzed chat content between the real users.

The human relationship information includes information relating to a relationship between the artist U and another person (target person), and specifically includes a relationship to the target person and a common keyword. Further, in a case where persons are related to each other, bots that are substituted for the individual persons are also related to each other. Therefore, for example, a first bot joining in the chat and a second bot relating thereto appear in the chat, thereby enabling the conversation to be further animated. In the case, messages of the individual bots are generated by using a relationship between the person linked to the first bot and the person linked to the second bot or the common keyword, thereby enabling the personality of the linked person to be further faithfully exhibited and interest of the user to be attracted.

The above specific description has been given of the profile (i.e., knowledge data) of the bot stored in the bot knowledge DB 12. Note that keywords included in the individual tables described with reference to FIG. 4 may be actually managed with an ID. In the case, the keyword is extracted from a keyword information table stored in the bot knowledge DB 12 on the basis of a keyword ID. FIG. 5 illustrates an example of the keyword information table according to the present embodiment. As illustrated in FIG. 5, the keyword information table includes the keyword ID and a keyword corresponding thereto. Furthermore, IDs (similar keyword IDs) of a similar keyword correspond to the individual keywords, thereby enabling registration of the similarity between the keywords and also registration of a synonym (for example, a concert and a live).

The content DB 13 stores content of a music piece, a video image, or the like, and is used in a case where a famous person promotes the music piece or the video image and a link destination is added to a chat in which a bot of the famous person joins as advertisement. Note that, in the present embodiment, the content DB 13 is in the processing server 1. However, the present disclosure is not limited to this and the content DB 13 may be in an external server.

The above specific description has been given of the configuration of the processing server 1 according to the present embodiment. Subsequently, a specific description will be given of operating processing according to the present embodiment.

3. OPERATING PROCESSING

<3-1. Response Control of Famous-Person Bot>

First, hereinbelow, a specific description will be given of response control of a famous-person bot with reference to FIGS. 6 to 13.

(3-1-1. Message posting processing of famous-person bot)

Figure 6:
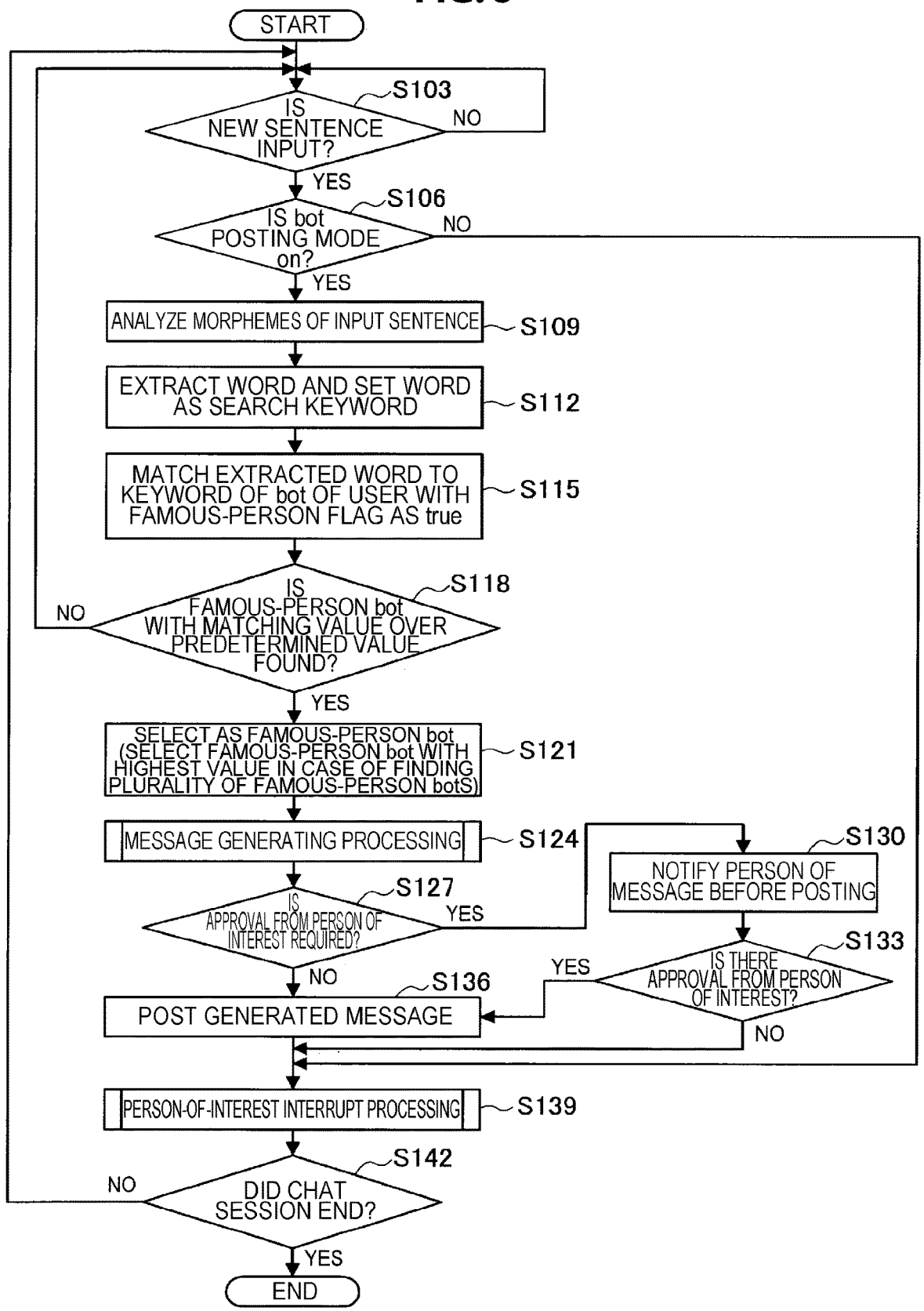
FIG. 6 is a flowchart illustrating message posting processing of a famous-person bot according to the present embodiment.

FIG. 6 is a flowchart illustrating message posting processing of a famous-person bot according to the present embodiment. As illustrated in FIG. 6, the control unit 10 in the processing server 1 waits that a real user inputs a new sentence on a chat by using the information processing device 2 (step S103). Note that, if this flow is executed every time when the message is inputted to the chat, a bot is posted to the writing of the user every time and it is thus unnatural and troublesome for the user. Therefore, the processing server 1 may set, as a trigger, a case of performing the exchange a constant number of times in the chat between real users or a case where a constant time passes after starting the conversation.

Next, in a case where a new sentence is inputted (step S103/Yes), the control unit 10 in the processing server 1 checks whether or not a bot posting mode is on (step S106). A real user can preset on/off of the bot posting mode. In a case where joining in the bot is not required, the bot posting mode is set to off.

Subsequently, in a case where the bot posting mode is on (step S106/Yes), the control unit 10 applies, by the analyzing unit 101, a text analysis such as a morphological analysis to a text message as the conversation on the chat of the real user (step S109).

Next, the analyzing unit 101 resolves a document into words from a result of the morphological analysis and sets them as search keywords (step S112).

Subsequently, the bot selecting unit 102 searches the bot knowledge DB 12 with the search keyword (step S115). Specifically, the bot selecting unit 102 performs matching between the extracted word (search keyword) and the profile of the person with a famous-person flag indicating true in the profiles stored in the bot knowledge DB 12, and adds a score corresponding to the number of matching keywords. For example, the score may be one point in one matching, and the activity information may be weighted with two points or the activity information of an advertisement target may be weighted with three points.

Next, the above-mentioned processing is repeated until finding the famous-person bot with which the matching value is over a predetermined value (step S118).

Subsequently, in a case of finding the famous-person bot satisfying a condition (step S188/Yes), the bot selecting unit 102 selects the bot as the famous-person bot (step S121). Note that, in a case where there is a plurality of famous-person bots satisfying the condition, the bot selecting unit 102 may select a bot with the highest score. Further, since it is considered that the same famous-person bot is used naturally in the same chat session, the famous-person bot that first appears may be continuously and preferentially selected. Further, in a case where another famous-person bot having human relationship information close to that of the famous-person bot already joining in the chat session also satisfies the condition, it may be set that the other famous-person bot with the relation is newly selected and a plurality of famous-person bots is joined in the chat.

Subsequently, the message generating unit 103 generates a bot message on the basis of the profile of the selected famous-person bot and analysis contents of the message between the real users (step S124). A specific description will be given later of message generating processing of the famous-person bot with reference to FIG. 7. However, for example, a message can be generated by determining whether or not advertisement is included. Further, the message generating unit 103 may use a fixed phrase that is prepared in advance for each bot or matched keyword, or may automatically generate a message by using an existing sentence generating engine. Further, the message generating unit 103 can produce a message added with a dialect in consideration of a hometown, age, or the like included in the bot profile, or a message with a way of speaking specific to adult, child, female, or male.

Next, in a case where approval from a person of interest is required for posting of the generated bot message (step S127/Yes), the notification control unit 105 notifies the person linked to the bot of a message before the posting, and requests the approval (step S130). The person can set in advance the presence or absence of the approval from the person of interest. In a case of the famous-person bot, it is assumed that a large number of approval applications to the linked famous person are requested. However, for example, on a screen of an information processing terminal on the side of the famous person, a large number of approval applications are processed for scroll display, and the famous person may check and approve a flowing request at favorite time.

Subsequently, in a case where the person is approved (step S133/Yes), the presentation control unit 104 controls to post the generated message to the chat between the real users (step S136).

Next, in a case where interrupt processing of the person linked to the bot is performed, this is executed (step S139). Details of the person-of-interest interrupt processing will be described later with reference to FIG. 9. The bot posting mode may be set to off during the person-of-interest interrupt, or may be set not to off because there is a case where it is fun even if the bot and the person simultaneously appear and have a conversation therebetween.

Further, in a case where the person linked to the bot is not approved in the step S133 or in a case of time-out (step S133/Yes), the generated message is not posted. In a case where the person performs the interrupt processing, this is executed (step S139).

Subsequently, until the chat session ends (step S142), the steps S103 to S139 are repeated. The chat session ends in an assumed case where an operation for clearly ending the session is not performed or writing is not performed for a constant time.

(3-1-2. Message Generating Processing of Famous-Person Bot)

Figure 7:
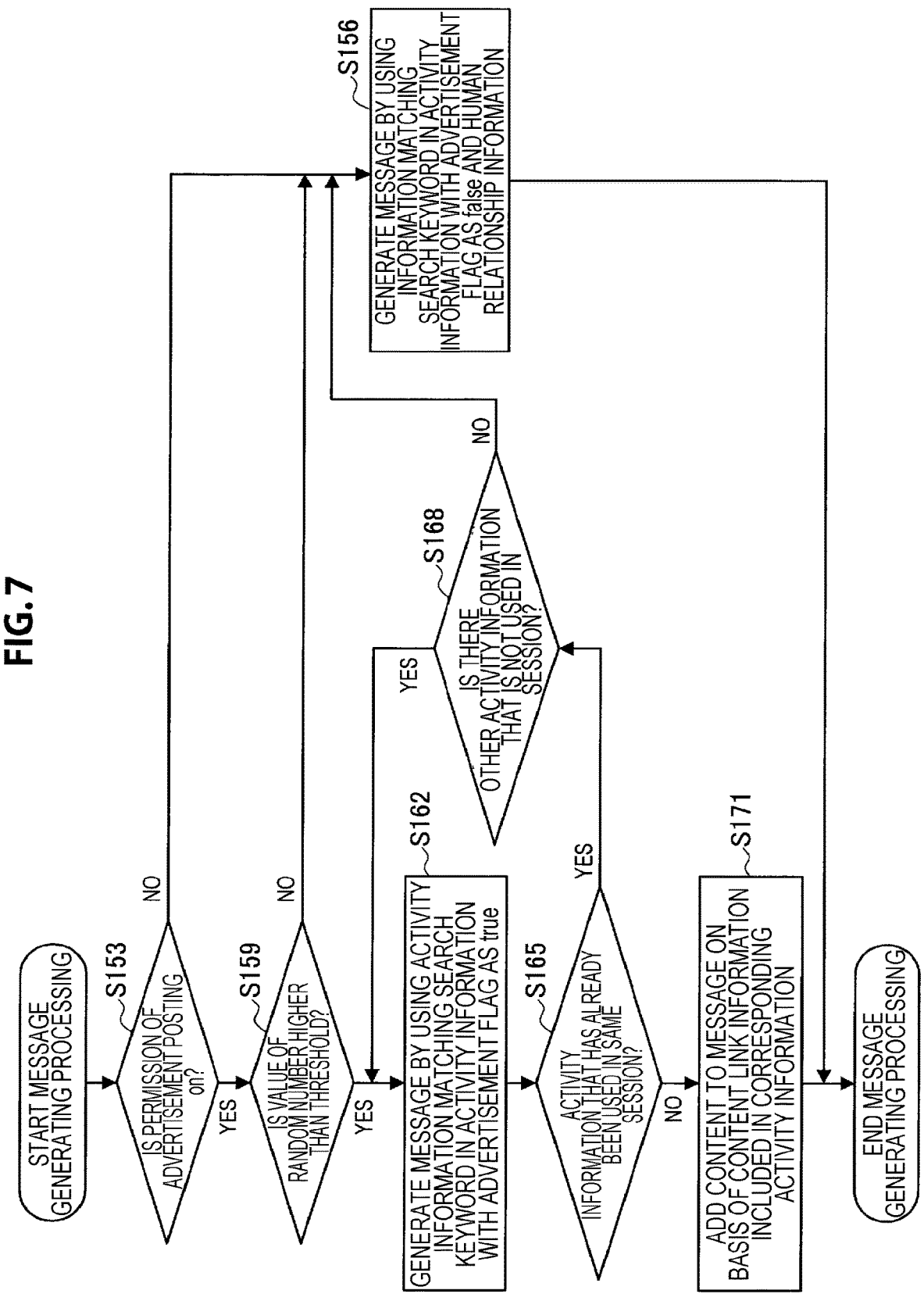
FIG. 7 is a flowchart illustrating message generating processing of a famous-person bot according to the present embodiment.

Next, a specific description will be given of the message generating processing illustrated in the step S124 with reference to FIG. 7. FIG. 7 is a flowchart illustrating the message generating processing of the famous-person bot according to the present embodiment.

As illustrated in FIG. 7, first, the message generating unit 103 checks whether or not the advertisement posting using the bot is permitted (step S153).

Next, in a case where advertisement posting is permitted (step S153/Yes), the message generating unit 103 generates a random number and checks whether or not the random number is larger than a threshold (step S159). The random number is used for the purpose of preventing the advertisement posting every time in the case where the advertisement is permitted. If realizing the purpose, such a method is used that the random number may not be used and advertisement may be issued, for example, every third time.

Subsequently, in a case where a value of the random number is over the threshold (step S159/Yes), the message generating unit 103 generates a message by using activity information matching the search keyword extracted from the chat of the real user in the activity information with the advertisement flag as true in the profile of the selected famous-person bot stored in the bot knowledge DB 12 (step S162).

Next, in a case where the matching activity information has been already used in the same chat session (step S165/Yes), activity information that is not used in the session is used in other activity information existing in candidates (step S168).

In a case where there is no other activity information that is not used in the session (step S168/No), the message generating unit 103 generates a message by using information matching the search keyword extracted from the chat in the activity information with the advertisement flag as false and the human relationship information (step S156). Note that in a case where the value of the random number is not larger than the threshold in the S159 (step S159/No), or in a case where the advertisement posting is not permitted in the S153 (step S153/No), similarly, the message generating unit 103 generates the message by using the information with the advertisement flag as false, and the information matching the search keyword (step S156).

On the other hand, in a case where the matching activity information is not used in the same chat session (step S165/No), the message generating unit 103 adds a content link to the message on the basis of content link information (refer to FIG. 4) included in the activity information (step S171). Note that in a case of a format for enabling the content to be directly embedded in the message, the content itself may be directly displayed on the message. Herein, a description will be given of a display example of the generated bot message with reference to FIG. 8.

Figure 8:
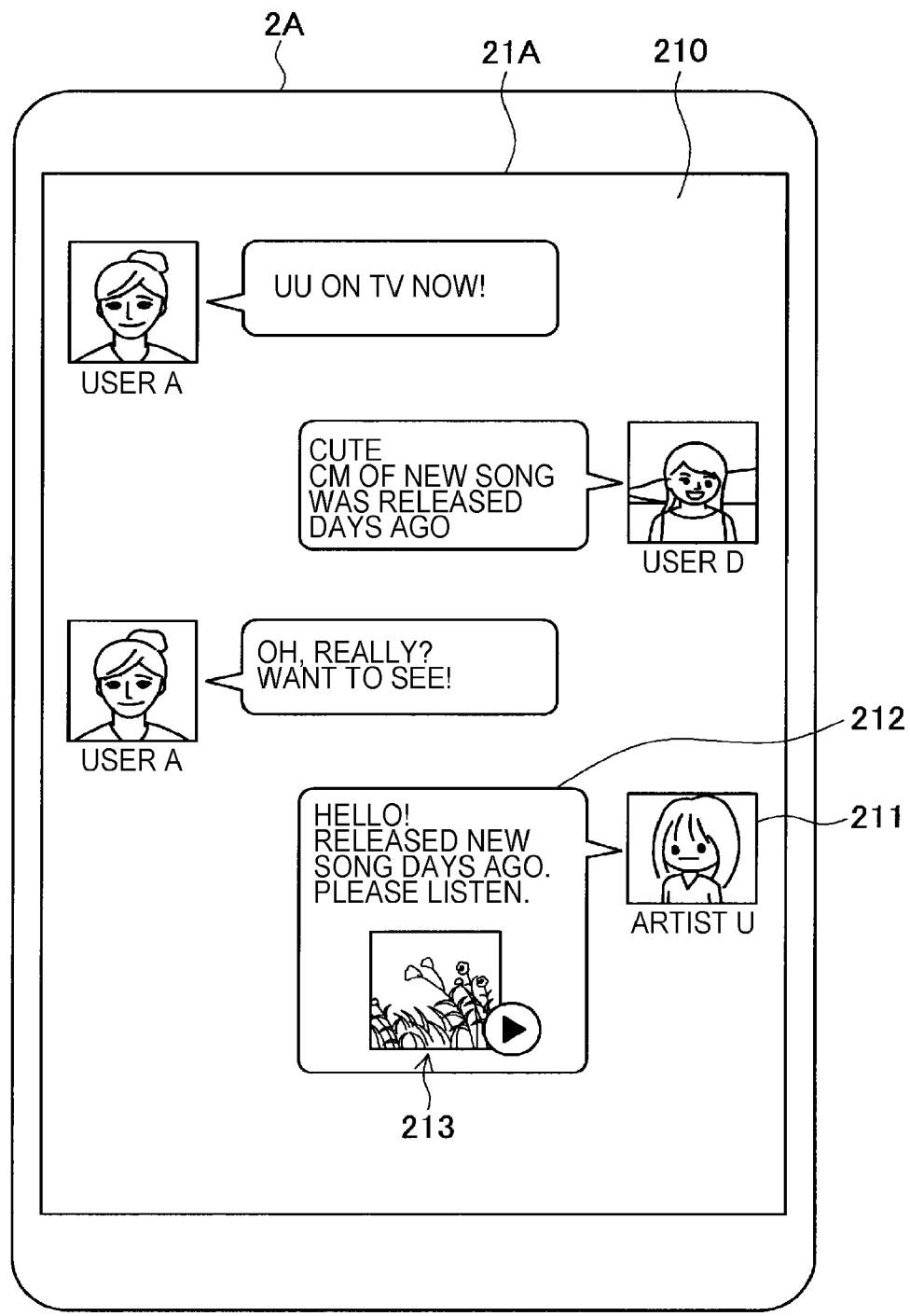
FIG. 8 is a diagram explaining a message display example of a famous-person bot according to the present embodiment.

FIG. 8 is a diagram explaining a message display example of a famous-person bot according to the present embodiment. In the illustrated example, a chat screen 210 is displayed on a display unit 21A in the information processing device 2A of the user A. Herein, regarding an artist U (nickname "UU"), a message is exchanged between a user A and a user D as real users. The processing server 1 selects a profile of the artist U on the basis of a keyword of "UU", "CM of new song", or the like, and generates the message. For example, in the profile of the artist U, the message is generated on the basis of the advertisement information as true relating to the new song. The generated message is posted on the chat between the real users as illustrated in FIG. 8. In the illustrated example, together with a bot icon 211 of the artist U, a message 212 including promotion information is displayed. Contents 213 are directly embedded to the message 212. A replay button is adhered to the content 213 to enable direct viewing by the user A and the user D. Note that in a case where the content is music or a motion picture, it can be set that a user who is registered to subscription-type services can try to view all, and a user who is not registered thereto can try to view only for first 30 sec. Further, the message generating unit 103 may generate and post a message that displays a member registration button with a comment like "Free listening with member registration!". Further, in a case where the content shows a general product, a product image on a Web site for Internet mail order may be pasted into the message, additionally displayed with a purchase button, and be posted with a message such as "You can buy here!".

(3-1-3. In-Person Interrupt Processing)

Figure 9:
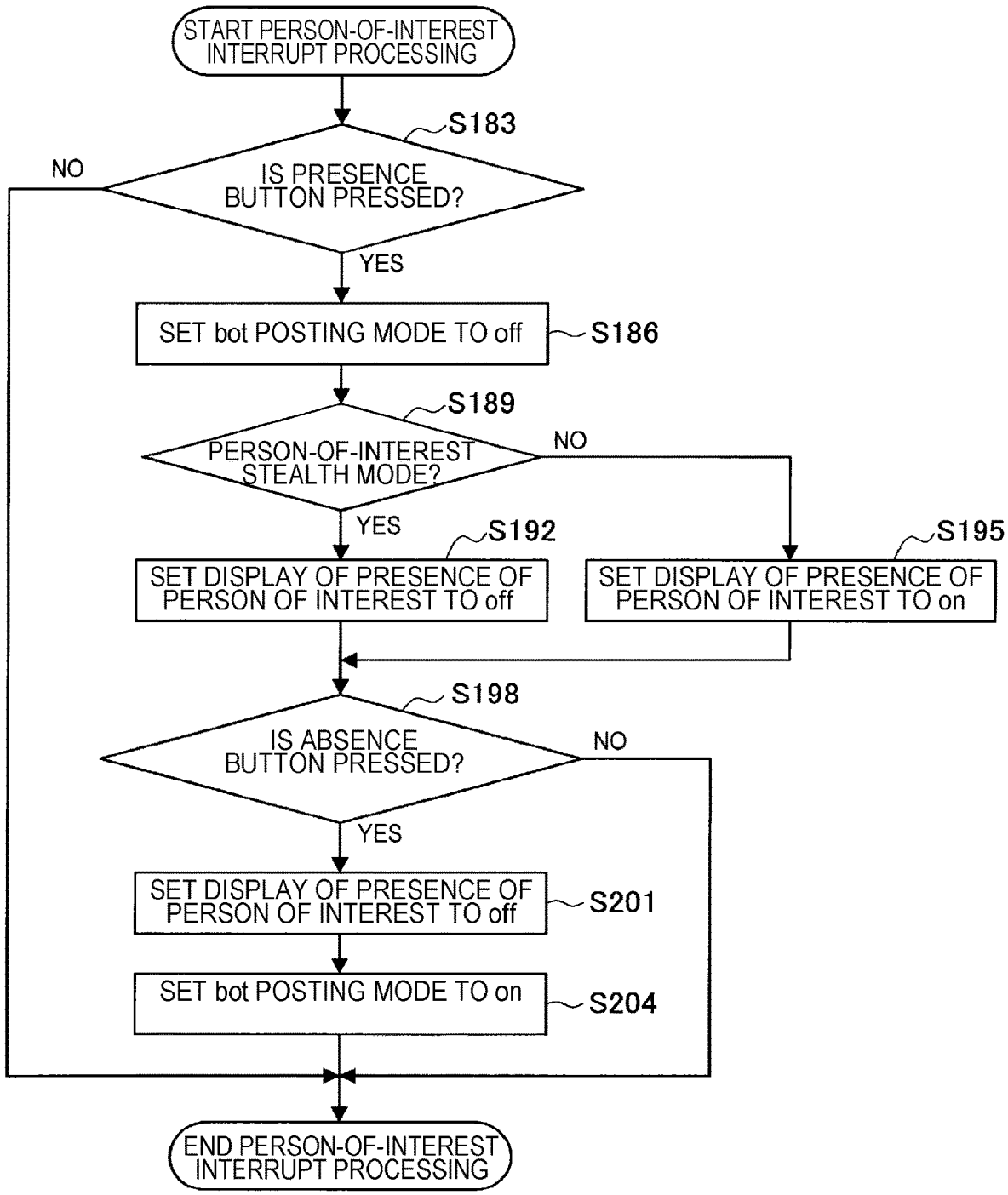
FIG. 9 is a flowchart illustrating person-of-interest interrupt processing according to the present embodiment.

Subsequently, a description will be given of person-of-interest interrupt processing illustrated in the step S139 with reference to FIG. 9. FIG. 9 is a flowchart illustrating the person-of-interest interrupt processing according to the present embodiment.

Figure 10:
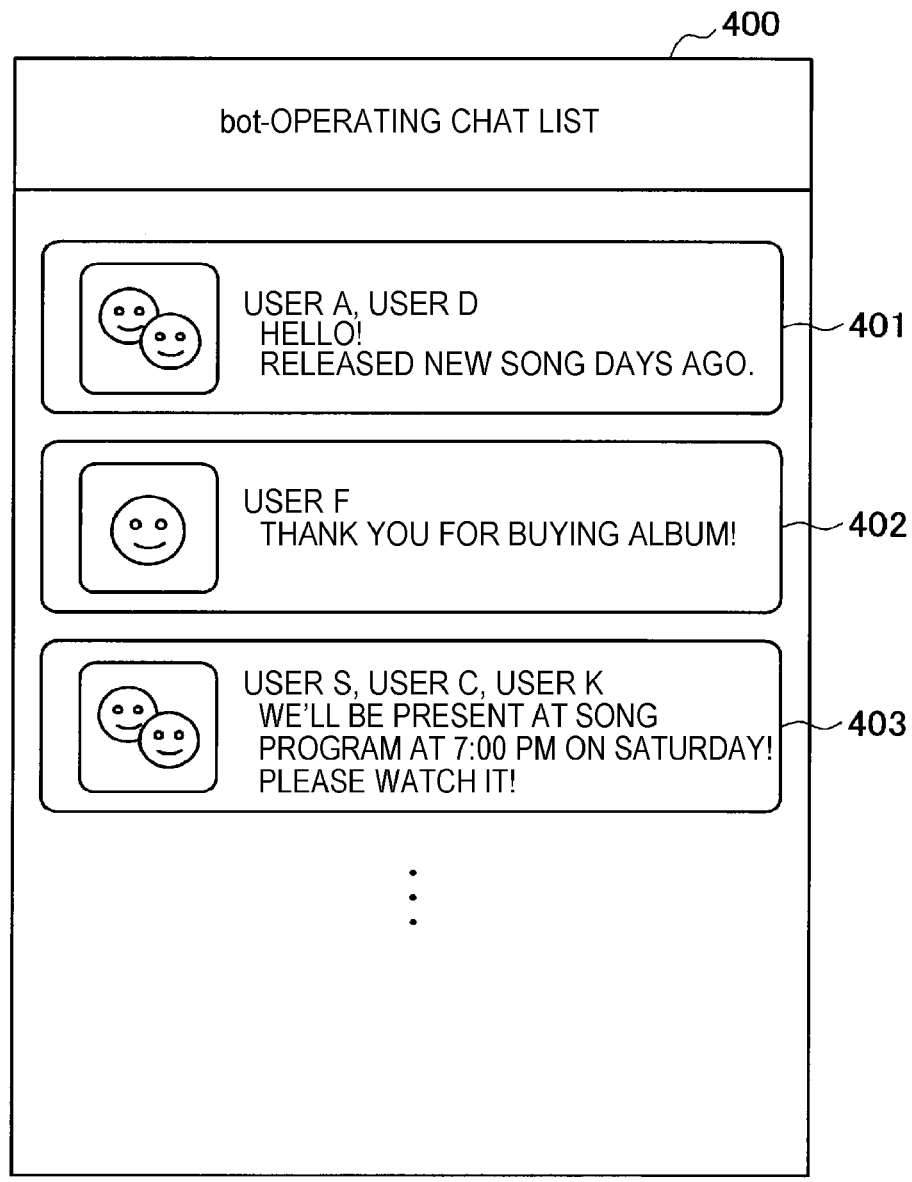
FIG. 10 is a diagram illustrating an example of a bot-operating chat list screen according to the present embodiment.

As illustrated in FIG. 9, first, the control unit 10 in the processing server 1 determines whether or not a presence button indicating the start of the person-of-interest interrupt processing is pressed (step S183). According to the present embodiment, in a case of posting a bot, contents of the posted message may be notified to a person linked to the bot, or the exchange between the real users after/before posting the bot in the chat at a posting destination may be able to be viewed. Herein, FIG. 10 illustrates an example of a bot-operating chat list screen, displayed on a display unit in an information processing terminal of the person linked to the bot.

A bot-operating chat list screen 400 illustrated in the drawing illustrates a list of chat sessions in which a bot for performing promotion in substation for the person is in operation. In a case where a famous person himself/herself sees chat sessions 401, 402, and 403 and has a chat session to which the famous person also wants to have a direct statement, the chat session is tapped and selected. A current bot message is displayed to the chat sessions 401, 402, and 403. For example, in a case of selecting the chat sessions 401, a display screen shifts to a chat screen 410 illustrated in FIG. 11. A presence button 411 is displayed on the chat screen 410. In a case where the famous person himself/herself wants to join in the chat in place of the bot, the presence button 411 is tapped. When the presence button 411 is tapped, the display screen shifts to a chat screen 420 illustrated in FIG. 12. That is, a text input column 421 is newly displayed, and the famous-person himself/herself inputs text and selects a posting button, In a case of pressing the presence button 411 (step S183/Yes), the control unit 10 in the processing server 1 sets a bot posting mode to off (step S186) As a consequence, the message posting with the bot is stopped during the attendance of the person of interest.

Next, the control unit 10 checks whether or not a person-of-interest stealth mode is set (step S189). The person-of-interest stealth mode is a mode that allows the user of the chat at the joining destination not to recognize the attendance of the person of interest. The person-of-interest stealth mode may be set in advance by the famous-person himself/herself or may be able to properly set at joining timing.

Figure 11:
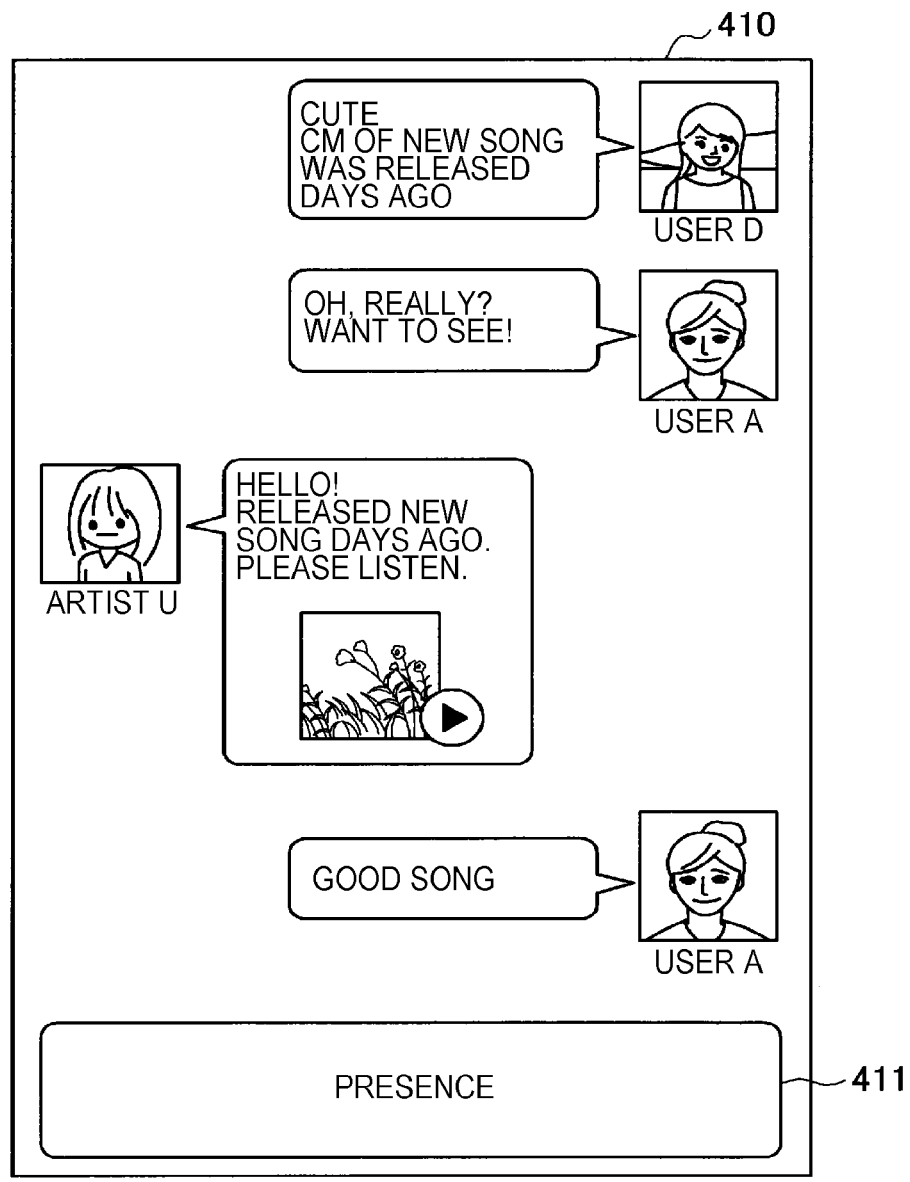
FIG. 11 is a diagram illustrating an example of a chat screen including a presence button according to the present embodiment.
Figure 12:
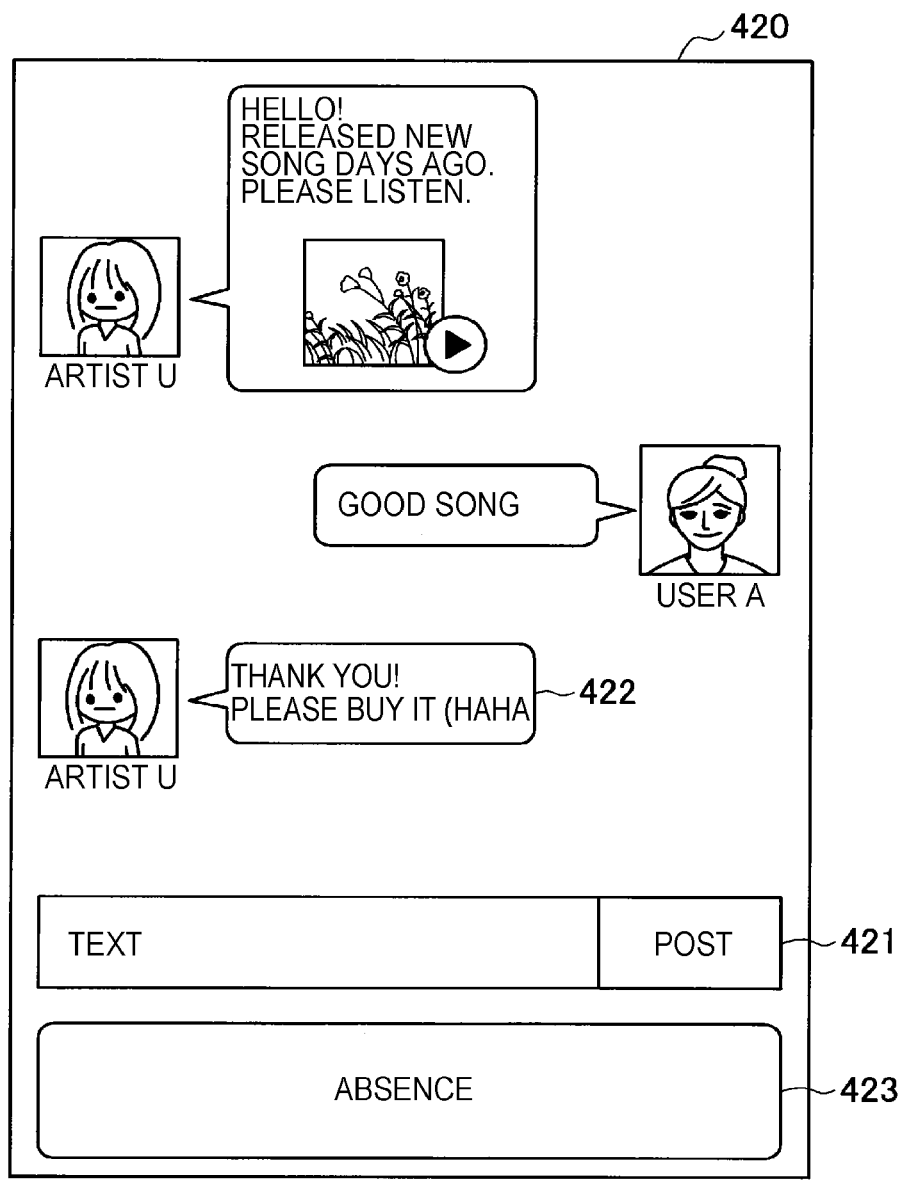
FIG. 12 is a diagram illustrating a message input screen in a case of a person-of-interest stealth mode according to the present embodiment.

Subsequently, in a case of setting the person-of-interest stealth mode (step S189/Yes), the display of the presence of the person of interest is set to off, and the message inputted by the famous person himself/herself is posted to the chat with the bot icon as it is (step S192). FIG. 12 illustrates the message input screen in the case of the person-of-interest stealth mode. The chat screen 420 illustrated in FIG. 12 is a shifting screen in the case of tapping the presence button 411 illustrated in FIG. 11, and the chat screen of the real user in which the bot joins, the text input column 421, and an absence button 423 are displayed. The famous person himself/herself inputs text to the text input column 421, and selects a posting button, thereby enabling the message to be posted to the chat. Herein, since the person-of-interest stealth mode is set, a message 422 posted by the person is displayed with the bot icon.

Figure 13:
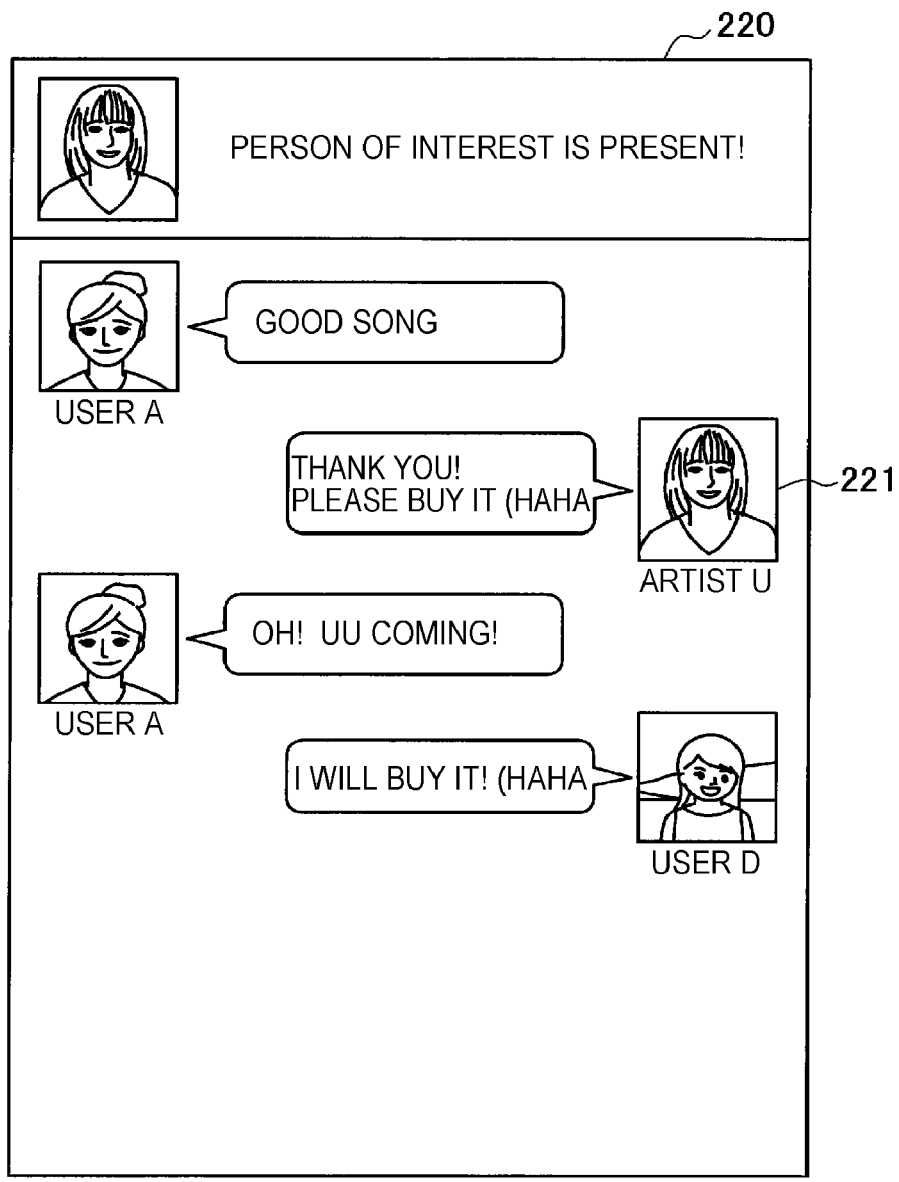
FIG. 13 is a diagram illustrating an example of a chat screen in a case where display of presence of a person of interest is on according to the present embodiment.

On the other hand, in a case where the person-of-interest stealth mode is not set (step S189/No), the display of the presence of the person of interest is on, and the message inputted by the famous person himself/herself with the icon of the famous person is posted to the chat (step S195). Herein, FIG. 13 illustrates an example of the chat screen in a case where the display of the presence of the person of interest is on. A chat screen 220 illustrated in FIG. 13 is a screen displayed on a display unit in the information processing device 2A of the user A, and display of "person of interest is present!" indicating that the famous-person himself/herself is present is shown, for example, above. Further, the message of the person of interest is displayed with a person-of-interest icon 221. As a consequence, the user A and the user D realize that the famous person himself/herself in a topic thereof appears and it is expected that the conversation is further animated. Note that the speech discrimination between the person and the bot may be illustrated by the difference in icons as illustrated in FIGS. 12 and 13. In addition, for example, it can be considered that the color of a speech balloon of the message is changed and a font of the message is changed (for example, in a case of a speech of the bot, a font like a robot is used).

Subsequently, the control unit 10 in the processing server 1 determines whether or not an absence button 423 (refer to FIG. 12) is pressed to end the person-of-interest interrupt processing (step S198).

In a case of pressing the absence button 423 (step S198/Yes), the control unit 10 sets the display of the presence of the person of interest to off (step S201), and sets the bot posting mode to on (step S204).

The person-of-interest interrupt processing has been specifically described above according to the present embodiment. Note that there is also a case where it is felt that writing independently and freely by both the person and the bot is more fun. Therefore, both the bot and the person can perform posting at free timing without providing the presence button 411 as illustrated in FIG. 11. Further, in the case, the presence and absence of the display discrimination between the bot and the person may be used.

<3-2. Response Control of Ordinary-Person Bot>

The famous-person bot has been specifically described in the aforementioned embodiment. However, the present embodiment is not limited to this. If the profile of the ordinary person is registered to the bot knowledge DB 12, similarly, the ordinary-person bot can be jointed in the chat between the real users. Hereinbelow, a specific description will be given with reference to FIGS. 14 to 16.

FIG. 14 is a diagram illustrating an example of the profile of the ordinary person stored in the bot knowledge DB 12 according to the present embodiment. Similarly to the famous-person profile illustrated in FIG. 4, the profile of the ordinary person also includes the basic profile, the activity information, and the human relationship information. However, in a case of the profile of the ordinary person, differently from the case of the famous person, charged content does not exist in the type of activity, and the profile includes posting of a personal daily social networking service (SNS) or contents clearly edited from the editing terminal 3. The profile may be edited by the person or also edited by a person registered as a friend in the service. Further, an editing right may be individually given to another person that the person can trust.

Figure 15:
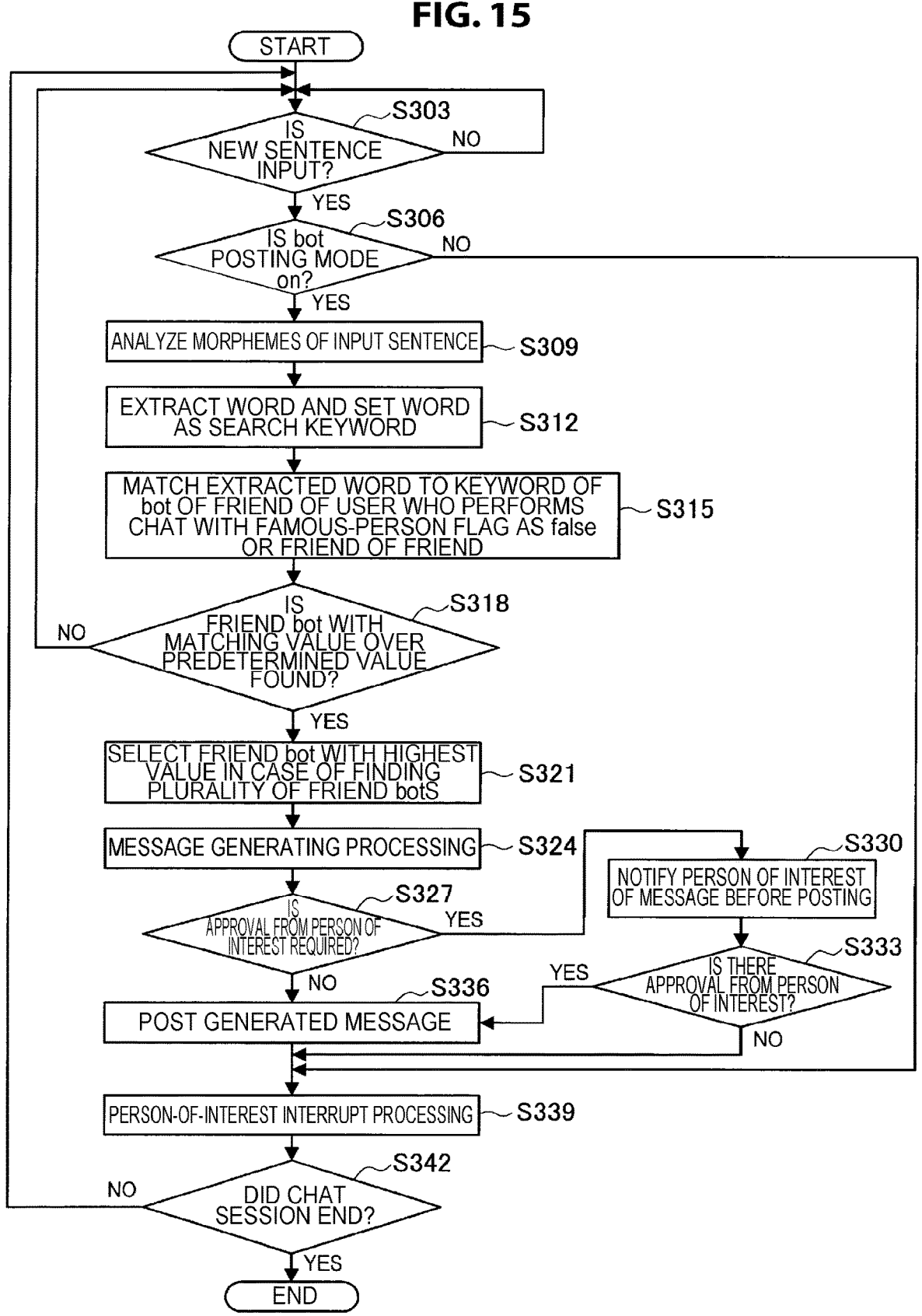
FIG. 15 is a flowchart illustrating message posting processing of an ordinary-person bot according to the present embodiment.

FIG. 15 is a flowchart illustrating the message posting processing of the ordinary-person bot according to the present embodiment. In step S303 to step S312 illustrated in FIG. 15, similarly to step S103 to step S112 in the processing of the famous-person bot described with reference to FIG. 6, the message exchanged in the chat between the real users is analyzed.

Subsequently, the bot selecting unit 102 matches the extracted word to a keyword of the bots of a friend of a real user who performs the chat with a famous-person flag as false or a friend of the friend (step S315) Whether or not he/she is the friend of the real user or a friend of the friend can be determined by using information for registering friends in the chat services, information registered to the bot knowledge DB 12, or the like.

Next, the bot selecting unit 102 selects a friend bot on the basis of the matching value (steps S318 and S321).

Subsequently, the message generating unit 103 generates the message on the basis of the profile of the selected friend-bot (step S324). In the case, with the ordinary-person bot, it may be set that the advertisement cannot be posted, alternatively, it may be set that specific advertisement registered by the person can be posted.

Figure 16:
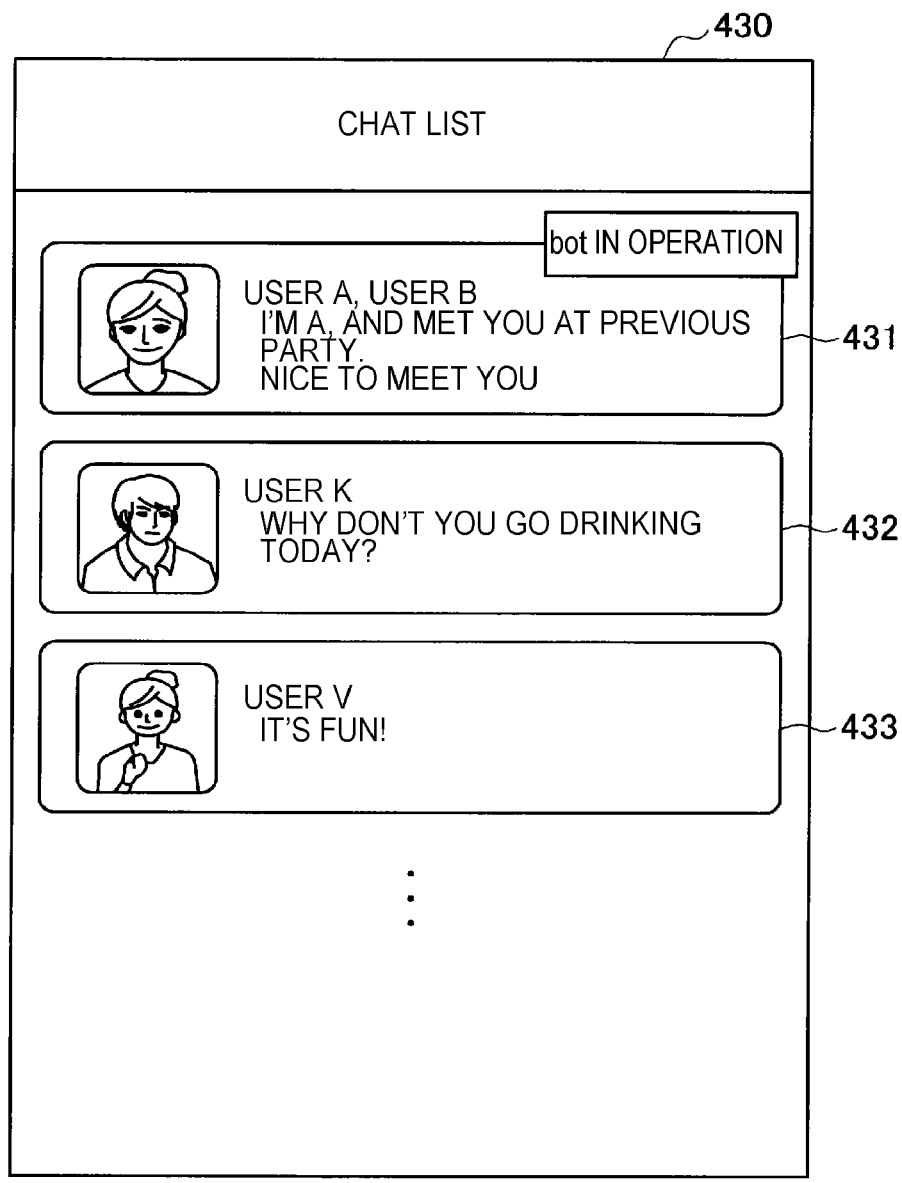
FIG. 16 is a diagram explaining a chat list screen according to the present embodiment which illustrates that a bot is in operation.

Hereinbelow, the person-of-interest approval processing illustrated in steps S327 to S333, posting processing of the generated the message illustrated in step S336, and the person-of-interest interrupt processing illustrated in step S339 are similar to steps S127 to S139 in the processing of the famous-person bot described with reference to FIG. 6. Note that it can be checked whether or not the bot that is substituted for the person is in operation with the chat of another user by a chat list screen 430 as illustrated in FIG. 16. In the illustrated example, the chat list screen 430 displays chat sessions 431, 432, and 433. In a case where a bot is in operation, "bot in operation" is displayed in the corresponding chat session, it is possible to see a current message in the corresponding chat session and the message exchanged after posting the bot.

Subsequently, the steps S303 to S339 are repeated until ending the chat session (step S342).

The posting processing of the ordinary-person bot has been specifically described above. Regarding the ordinary-person bot, a bot of a user relating to the user who performs the chat appears. As a consequence, for example, in a case where the user A talks in the chat about the user C whom the user A first met at a party or the like and was interested in, with the user B who attended the party together, and further the user C is registered as a friend of the user B or a friend of the friend, as illustrated in FIG. 1, on the chat screens of the user A and the user B, it can be expected that the bot of the user C appears and the conversation might be animated. Further, according to the present embodiment, on the chat list screen 430 as illustrated in FIG. 16, it can be checked whether or not the bot that is substituted for the person is in operation in the chat of another user. The chat list screen 430 illustrated in FIG. 16 is an example of the screen displayed on, for example, the information processing device of the user C, and the chat sessions 431, 432, and 433 in progress are displayed. Among the chat sessions, it is clearly shown that the bot of the user C himself/herself is in operation in the chat sessions 431 with display of "bot in operation". As mentioned above, in a case where the bot of the user C appears corresponding to the exchange between the user A and the user B, contents of the chat between the user A and the user B are notified to the user C. Thus, even in a case where the user A does not know contact or specific information of the user C, it is capable of assisting even a state where they can naturally contact with each other.

4. EDITING OF BOT KNOWLEDGE DB

Subsequently, a description will be given of editing the bot profile stored in the bot knowledge DB 12 with reference to FIGS. 17 and 18. The bot profile can be edited from the editing terminal 3 or the information processing device 2.

FIG. 17 is a diagram illustrating an example of a basic profile editing screen 310 of the bot profile according to the present embodiment. As illustrated in FIG. 17, there is also a case of information whose part cannot be edited. Name and age are obtained and calculated on the system side from information for registering services linked to the person.

FIG. 18 is a diagram illustrating an example of an activity information editing screen 320 of a bot profile according to the present embodiment. As illustrated in FIG. 18, the activity information can be also manually inputted. Further, the activity information may be cooperated with predetermined SNS to perform periodical auto-mining from articles posted by the person and update a keyword and the like.

Although the editing screen of the human relationship information is not particularly illustrated, for example, the user can search a name of a target person, obtain the displayed target person ID, select the relationship with the person from options, and register the relationship thereof. Further, it may be possible to freely and manually input a keyword common to the target person. Alternatively, the common keyword from the SNS or profile therebetween may be automatically extracted and registered.

5. CONCLUSION

As mentioned above, the information processing system according to the embodiment of the present disclosure, a conversation can be animated by a response of a virtual agent having a proper personality corresponding to a communication situation between users.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is possible to produce a computer program to cause hardware such as a CPU, a ROM, and a RAM included in the above-mentioned processing server 1, information processing device 2 or editing terminal 3 to exhibit the functions of the processing server 1, the information processing device 2, or the editing terminal 3. Further, a computer-readable storage medium that stores the computer program is also provided.

Further, the information processing system according to the present embodiment is not limited to the text chat but can be applied to voice chat. For example, such a voice chat system is assumed that text is converted into sound and the sound is reproduced. Furthermore, in a case of applying the information processing system to the voice chat system, in a case where the message generating unit 103 generates a bot message in the processing server 1, synthesized sound is generated by using phoneme data of a person linked to a bot, and it can be controlled to output a bot message with the sound similar to the person.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing system including:
a virtual agent profile database that accumulates profiles of a plurality of virtual agents capable of communication on a network; and
a control unit that
  selects one virtual agent from the plurality of virtual agents in accordance with an analysis result of communication between real users,
  generates a message in accordance with the analysis result and the profile of the one virtual agent, and
  posts the generated message to a communication session between the real users.
(2)
The information processing system according to (1), in which
the control unit embeds, into the message, a link of content matching at least any one of the analysis result and the profile of the one virtual agent.
(3)
The information processing system according to (2), in which the content is advertisement content.
(4)
The information processing system according to any one of (1) to (3), in which
the profile of the virtual agent includes at least any of basic information, activity information, and personal relationship information of a person or a character linked to the virtual agent.
(5)
The information processing system according to any one of (1) to (4), in which
the control unit notifies a user himself or herself for whom the one virtual agent is substituted of the message before or after posting the message to the communication session between the real users.
(6)
The information processing system according to (5), in which
the control unit posts a message generated by the user himself or herself to the communication session between the real users in response to a request from the user himself or herself
(7)
The information processing system according to (5) or (6), in which
the control unit controls to generate a display screen of the communication session, the display screen being capable of determining posting of the one virtual agent or posting of the user himself or herself.
(8)
The information processing system according to any one of (1) to (7), in which
the control unit notifies a user himself or herself for whom the one virtual agent is substituted of the message before posting the message to the communication session between the real users, and posts the message to the communication session between the real users in response to approval from the user himself or herself.
(9)
The information processing system according to any one of (1) to (8), in which
the control unit provides a user interface capable of editing the profile of the one virtual agent.
(10)
An information processing method including, by a processor:

selecting one virtual agent from a plurality of virtual agents capable of communication on a network in accordance with an analysis result of communication between real users;

generating a message in accordance with the analysis result and a profile of the one virtual agent accumulated in a virtual agent profile database; and posting the generated message to a communication session between the real users.

REFERENCE SIGNS LIST 1 processing server
10 control unit
101 analyzing unit
102 bot selecting unit
103 message generating unit
104 presentation control unit
105 notification control unit
11 communication unit
12 bot knowledge DB
13 content DB
2 information processing device
3 editing terminal
4 network
5 group of information

The invention claimed is:

1. An information processing system comprising:
a virtual agent profile database that accumulates profiles of a plurality of virtual agents capable of communication on a network; and
processing circuitry configured to
select one virtual agent from the plurality of virtual agents in accordance with an analysis result of communication between real users, the one virtual agent representing a real person,
generate a message in accordance with the analysis result and a profile of the one virtual agent, and
post the generated message to a communication session between the real users along with an icon illustrating that the generated message is from the one virtual agent and not from the real person, the communication session including icons representing the real users along with messages from the real users, as well as the icon illustrating that the generated message is from the one virtual agent and not from the real person, the icon including an image of the one virtual agent that is generated by processing an icon or an image of the real person represented by the one virtual agent.

2. The information processing system according to claim 1, wherein
the processing circuitry is configured to embed, into the message, a link of content matching at least any one of the analysis result and the profile of the one virtual agent.

3. The information processing system according to claim 2, wherein
the content is advertisement content.

4. The information processing system according to claim 1, wherein
the profile of the one virtual agent includes at least any of basic information, activity information, and personal relationship information of a person or a character linked to the one virtual agent.

5. The information processing system according to claim 1, wherein
the processing circuitry is configured to notify the real person himself or herself who the one virtual agent represents, of the message before or after posting the message to the communication session between the real users.

6. The information processing system according to claim 5, wherein
the processing circuitry is configured to post a message generated by the real person himself or herself to the communication session between the real users in response to a request from the real person himself or herself.

7. The information processing system according to claim 5, wherein
the processing circuitry is configured to control generating a display screen of the communication session, the display screen being configured to allow posting of the one virtual agent or posting of the real person himself or herself.

8. The information processing system according to claim 1, wherein
the processing circuitry is configured to notify the real person himself or herself who the one virtual agent represents, of the message before posting the message to the communication session between the real users, and post the message, along with the icon illustrating that the message is from the one virtual agent and not from the real person, to the communication session between the real users in response to approval from the real person himself or herself.

9. The information processing system according to claim 1, wherein
the processing circuitry is configured to generate a user interface via which the profile of the one virtual agent is editable.

10. An information processing method comprising:
selecting, by processing circuitry, one virtual agent from a plurality of virtual agents capable of communication on a network in accordance with an analysis result of communication between real users, the one virtual agent representing a real person;
generating, by the processing circuitry, a message in accordance with the analysis result and a profile of the one virtual agent accumulated in a virtual agent profile database; and
posting, by the processing circuitry, the generated message to a communication session between the real users along with an icon illustrating that the generated message is from the one virtual agent and not from the real person, the communication session including icons representing the real users along with messages from the real users, as well as the icon illustrating that the generated message is from the one virtual agent and not from the real person, the icon including an image of the one virtual agent that is generated by processing an icon or an image of the real person represented by the one virtual agent.

11. A non-transitory computer-readable storage medium including computer executable instructions, wherein the instructions, when executed by a computer, cause the computer to perform a method, the method comprising:
selecting one virtual agent from a plurality of virtual agents capable of communication on a network in accordance with an analysis result of communication between real users, the one virtual agent representing a real person;

generating a message in accordance with the analysis result and a profile of the one virtual agent accumulated in a virtual agent profile database; and posting the generated message to a communication session between the real users along with an icon illustrating that the generated message is from the one virtual agent and not from the real person, the communication session including icons representing the real users along with messages from the real users, as well as the icon illustrating that the generated message is from the one virtual agent and not from the real person, the icon including an image of the one virtual agent that is generated by processing an icon or an image of the real person represented by the one virtual agent.

* * * * *